（12） United States Patent
Betzler et al.

(10) Patent No.: US 8,676,724 B2
(45) Date of Patent: Mar. 18, 2014

(54) TRAINING WITH COMPLEX EVENT PROCESSING ENGINE TO IDENTIFY SEMANTIC MEANING OF VIRTUAL WORLD OBJECT STATE CHANGES

(75) Inventors: Boas S. Betzler, Magstadt (DE); Thang G. Pham, Poughkeepsie, NY (US); Sophie Wrobel, Karlsruhe (DE)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 12/715,431

(22) Filed: Mar. 2, 2010

(65) Prior Publication Data

US 2011/0218945 A1    Sep. 8, 2011

(51) Int. Cl.
    *G06F 15/18* (2006.01)
(52) U.S. Cl.
    USPC ................. 706/12; 709/224; 719/318
(58) Field of Classification Search
    None
    See application file for complete search history.

(56) References Cited

U.S. PATENT DOCUMENTS

2003/0074440 A1\* 4/2003 Grabarnik et al. ............ 709/224
2005/0138642 A1\* 6/2005 Breh et al. .................... 719/318

\* cited by examiner

*Primary Examiner* — Kakali Chaki
*Assistant Examiner* — Luis Sitiriche
(74) *Attorney, Agent, or Firm* — Ido Tuchman; William J. Stock

(57) ABSTRACT

Techniques for training a system to identify state changes in objects in virtual worlds. Base events transmitted by a virtual world engine are observed. Statistical analysis of the observed base events is performed. Based at least in part on this statistical analysis, a computer processor determines that a group of one or more of the observed base events is correlated to a first identified higher-level event. Optionally, the determination is based in part on a frequency of occurrence of the group of base events, on generated rules, or both. A candidate higher-level event including the group of base events thus determined is stored. User input is received about the candidate higher-level event. If so specified by the received user input, the candidate higher-level event is stored as a second identified higher-level event. As a result, the system is advantageously trained to identify higher-level events which represent abstract situations.

21 Claims, 4 Drawing Sheets

TRAINING WITH COMPLEX EVENT PROCESSING ENGINE TO IDENTIFY SEMANTIC MEANING OF VIRTUAL WORLD OBJECT STATE CHANGES

BACKGROUND OF THE INVENTION

1. Field of the Invention

The present invention relates generally to computer generated virtual worlds. More specifically, the present invention relates to techniques for training a system to identify state changes in objects in virtual worlds.

2. Description of Background

A virtual world is a computerized simulation of an environment. The environment may model either the real, physical world or a fictional world. Virtual worlds are typically presented visually to the users thereof. This visual presentation may be in either a two-dimensional form or a three-dimensional form. A virtual world may also be presented aurally.

Many virtual worlds known in the art facilitate interaction among multiple users. The interaction between the users occurs within the virtual world. Each user of the virtual world may be represented by an avatar within the virtual world. The avatar may be a likeness of the user, a generic figure or even a representation of an imaginary being. Generally, an avatar exists at a specific location within the virtual world at a given point in time. However, the avatar may move throughout the virtual world. Accordingly, an avatar may move in proximity to another avatar or avatars to interact therewith. As a result, the users associated with the avatars interact with each other.

SUMMARY OF THE INVENTION

One aspect of the invention is a method for training a system to identify state changes in objects in virtual worlds. The method comprises observing a group of base events. The method further comprises determining by a computer processor that the group of observed base events is correlated to a candidate higher-level event. Determining that the group of one or more of the observed base events is correlated to the candidate higher-level event is based at least in part on statistical analysis of the observed base events. The method further comprises storing the candidate higher-level event. The method further comprises receiving user input confirming that the group of base events is semantically correlated to the candidate higher-level event. The method further comprises storing the candidate higher-level event as an identified higher-level event if the received user input specifies that the group of base events is correlated to the candidate higher-level event.

Another aspect of the invention is a system for identifying state changes in objects in virtual worlds. The system comprises a computer processor. The system further comprises an event processing unit. The event processing unit is configured to observe base events. The event processing unit is further configured to determine by the computer processor that a group of one or more of the observed base events is correlated to a candidate higher-level event. Determining that the group of one or more of the observed base events is correlated to the candidate higher-level event is based at least in part on statistical analysis of the observed base events. The event processing unit is further configured to store the candidate higher-level event. The system further comprises a training unit. The training unit is configured to receive user input confirming that the group of base events is correlated to the candidate higher-level event. The training unit is further configured to store the candidate higher-level event as an identified higher-level event if the received user input specifies that the group of base events is correlated to the candidate higher-level event.

Another aspect of the invention is a computer program product for training a system to identify state changes in objects in virtual worlds. The computer program product comprises a computer readable storage medium having computer readable program code embodied therewith. The computer readable program code is configured to observe a group of base events. The computer readable program code is further configured to determine by a computer processor that the group of observed base events is correlated to a candidate higher-level event. Determining that the group of one or more of the observed base events is correlated to the candidate higher-level event is based at least in part on statistical analysis of the observed base events. The computer readable program code is further configured to store the candidate higher-level event. The computer readable program code is further configured to receive user input about the candidate higher-level event. The received user input comprises a confirmation that the group of base events is correlated to the candidate higher-level event. The computer readable program code is further configured to store the candidate higher-level event as an identified higher-level event if the received user input specifies that the group of base events is correlated to the candidate higher-level event.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
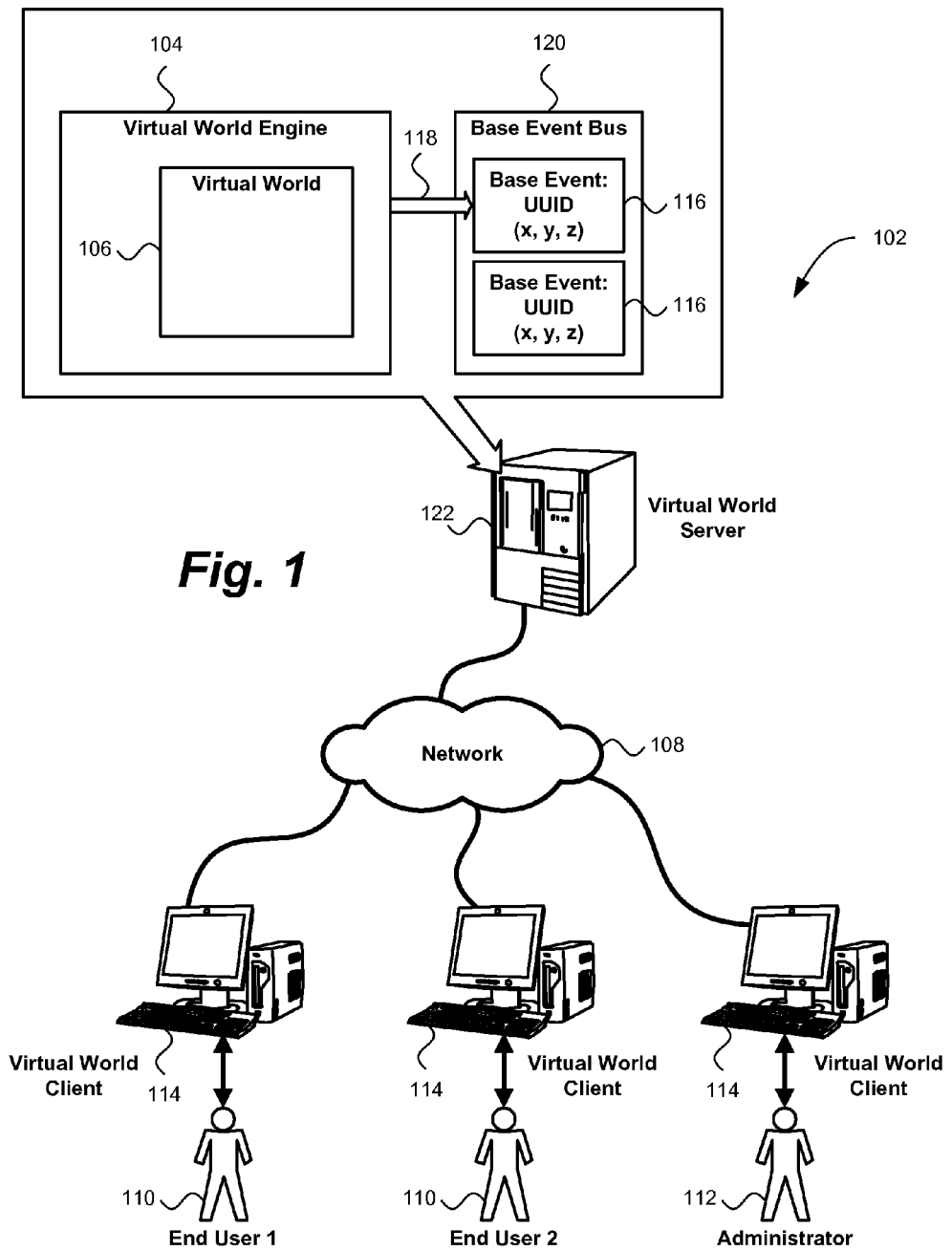
FIG. 1 shows an example environment embodying the present invention.

The present invention is described with reference to embodiments of the invention. Throughout the description of the invention reference is made to FIGS. 1-4. When referring to the Figures, like structures and elements shown throughout are indicated with like reference numerals.

Referring to FIG. 1, an example environment 102 embodying the present invention is shown. It is initially noted that the environment 102 is presented for illustration purposes only, and is representative of countless configurations in which the invention may be implemented. Thus, the present invention should not be construed as limited to the environment configurations shown and discussed herein.

The environment 102 includes one or more virtual world engines 104 for simulating environments executing in one or more virtual world servers 122. A virtual world engine implements one or more virtual worlds 106.

A virtual world server 122 may be implemented in hardware, in software or a combination thereof. A virtual world engine may be a general purpose computer. Such a computer may incorporate any of a wide variety of architectures. The computer may be based on a general purpose operating system such as the IBM® z/OS® operating system, the IBM AIX® operating system, the Linux® operating system, any flavor of the UNIX® operating system or the Windows® operating system. IBM, z/OS and AIX are registered trademarks of International Business Machines Corporation, Armonk, N.Y., United States, in the United States, other countries, or both. Linux® is the registered trademark of Linus Torvalds in the United States and other countries. UNIX is a registered trademark of The Open Group in the United States and other countries. Windows is a registered trademark of Microsoft Corporation, Redmond, Wash., United States, in the United States and/or other countries. Moreover, a virtual world engine may incorporate any of a wide variety of computer program products.

In an embodiment of the present invention, the virtual world engine 104 is the Lotus® Sametime® 3D software. Lotus and Sametime are registered trademarks of International Business Machines Corporation, Armonk, N.Y., United States, in the United States, other countries, or both. In another embodiment of the present invention, the virtual world engine is the Lotus Sametime software. In another embodiment of the present invention, the virtual world engine 104 is the Virtual Collaboration for Lotus Sametime (VCS) service offered by IBM Software Services for Lotus (ISSL). In another embodiment of the present invention, the virtual world engine 104 is the OpenSimulator server software. It is noted that OpenSimulator is also known as OpenSim.

The environment 102 shown in FIG. 1 includes only a single virtual world engine 104 implementing a single virtual world 106 and executing on a single virtual world server 122. It is emphasized that this is the case solely to simplify the drawings and to facilitate a concise explanation of the present invention. An environment embodying the present invention may comprise a plurality of virtual world engines executing on a plurality of virtual world servers. Similarly, a virtual world engine in an environment embodying the present invention may implement a plurality of virtual worlds simultaneously.

A virtual world 106 is a computerized simulation of an environment. In an embodiment of the present invention, the virtual world 106 exists in three dimensions. In another embodiment of the present invention, the virtual world exists in two dimensions.

The environment 102 further includes a network 108. The network may be any of a wide variety of systems known in the art for allowing two or more systems to communicate. The network may comprise any of a wide variety of networks such as the Internet, the public switched telephone network (PSTN), local area networks (LAN's) and wide area networks (WAN's). The network may employ any of a wide variety of network technologies such as Ethernet, IEEE 802.11, IEEE 802.16, the Bluetooth® technology, token ring, Digital Subscriber Line (DSL), cable Internet access, satellite Internet access, Integrated Services Digital Network (ISDN) and dial-up Internet access. Bluetooth is a registered trademark of Bluetooth SIG, Inc., Bellevue, Wash., United States. The network may include various topologies and protocols known to those skilled in the art, such as TCP/IP, UDP, and Voice over Internet Protocol (VoIP). The network may comprise direct physical connections, radio waves, microwaves or any combination thereof. Furthermore, the network may include various networking devices known to those skilled in the art, such as routers, switches, bridges, repeaters, etc.

The environment 102 further comprises one or more users 110, 112. A user may be a human being. A user may also be a technological device. Such a technological device may be implemented in hardware, software or a combination thereof.

A user may be an end user 110 of the virtual world. A user may also be an administrator 112 of the virtual world. The environment 102 shown in FIG. 1 includes two end users 110 and one administrator 112. However, it is emphasized that an environment embodying the present invention may include an arbitrary and possibly large number of end users, administrators or both.

The environment 102 further comprises one or more virtual world clients 114. A virtual world client facilitates access to a virtual world 106 by a user 110, 112. Such a user may be either an end user 110 or an administrator 112.

To facilitate this access, a virtual world client 114 may be coupled to a virtual world engine 104 via the network 108. The virtual world client may receive information about the virtual world 106 from the virtual world client. The virtual world client may then output the virtual world to the user based on the received information. Outputting the virtual world may include displaying a visual depiction of the virtual world, emitting an aural depiction of the virtual world, or transmitting information about the virtual world in any other manner. The virtual world client may also receive input from the user specifying the actions of the user within the virtual world. The virtual world client may transmit this input to the virtual world engine.

A virtual world client 114 may be any of a wide variety of technologies for accessing a virtual world. A virtual world client may be implemented in hardware, in software or a combination thereof. A virtual world client may be a general purpose computer. Such a computer may incorporate any of a wide variety of architectures. The computer may be based on a general purpose operating system such as the IBM z/OS operating system, the IBM AIX operating system, the Linux operating system, any flavor of the UNIX operating system or the Windows operating system. A virtual world client may also be a device other than a general purpose computer. Such devices may include hardware devices manufactured to perform a specific task. Such devices may also include personal digital assistants (PDA's) and mobile telephones. Moreover, a virtual world client may incorporate any of a wide variety of computer program products.

In an embodiment of the present invention, the virtual world client 114 is the Lotus Sametime 3D client software. In another embodiment of the present invention, the virtual world client is the Lotus Sametime client software. In another embodiment of the present invention, the virtual world client is the OpenViewer client software.

It is noted that the virtual world clients 114 may be heterogeneous. Specifically, they may differ from each other in architecture, operating system or other important respects.

In the environment 102 shown in FIG. 1, there exists a one-to-one correspondence between users 110, 112 and virtual world clients 114. Thus, each user accesses the virtual world 106 via its own virtual world client. It is emphasized that the present invention does not require this condition to hold. In particular, multiple users may, simultaneously or successively, access the virtual world via a common virtual world client. Alternatively, the same user may, simultaneously or successively, access the virtual world via multiple virtual world clients.

Multiple users 110, 112 may interact within a virtual world 106. Each such user may be represented by an avatar within the virtual world. Generally, an avatar exists at a specific location within the virtual world at a given point in time. However, the avatar may move throughout the virtual world.

More generally, a virtual world 106 may include one or more objects. The avatar of a user 110, 112 may be implemented as an object. However, an object may represent an entity other than a user. For example, a doorway at the entrance of a room may be represented as an object. As with avatars, an object generally exists at a specific location within the virtual world at a given point in time. This location may be represented by two-dimensional or three-dimensional Cartesian coordinates, e.g., (x, y) or (x, y, z) coordinates. Some objects may be capable of moving throughout the virtual world. Other objects, such as the aforementioned doorway, may be fixed in place.

It is emphasized that the interactions between users 110, 112 within a virtual world 106 may be complex. For example, collaborative meetings between users may occur within the virtual world.

The virtual world engine 104 may encode details of interactions occurring within a virtual world 106 as state changes. The state changes may be digitally captured, transmitted and stored. As a result, the state changes can be archived, reviewed, replayed, queried and analyzed.

A virtual world engine 104 may generate base events 116 to encode the state changes. The virtual world engine may transmit 118 the base events via an event bus 120. The virtual world engine may transmit the base events via the network 108 or may be coupled directly to the event bus. It is noted that a single virtual world 106 may cause a significant quantity of base events to be generated.

It is emphasized that a base event 116 may encode a state change in a very low-level form. For example, in an embodiment of the present invention, a base event encapsulates a unique identifier of an object along with updated three-dimensional Cartesian coordinates, e.g., (x, y, z) coordinates, of the object.

Low-level events (i.e., base events 116) are likely to carry insufficient context to communicate the semantic meaning of the interactions occurring within a virtual world 106. However, multiple low-level events may, in conjunction with each other, indicate a state change with a specific semantic meaning. Thus, the present invention identifies patterns of multiple low-level events which, observed together, indicate a higher-level event with a known semantic meaning.

Accordingly, in an embodiment of the present invention, the base events 116 generated for a virtual world 106 are handled using Complex Event Processing (CEP). CEP is primarily an event processing concept which is directed to the task of processing multiple events in order to identify the meaningful events within an event cloud. CEP may comprise detecting complex patterns of multiple events. A pattern thus detected may include a large number of events. CEP may also comprise event correlation and abstraction. CEP may also employ techniques such as event hierarchies, event-driven processes and relationships between events. Such relationships may include causality, membership and timing. It is emphasized that CEP is advantageously capable of processing the large quantities of event data streamed by many virtual worlds.

Furthermore, CEP is beneficially capable of discovering information contained in the events occurring throughout all layers of an organization. CEP can subsequently analyze impacts thereof from the macro level as complex events. CEP can subsequently plan actions to be taken in real time in response to the complex events.

By analyzing the base events 116 according to the foregoing techniques, the semantic meaning of virtual world object state changes can be advantageously determined. This is possible even if the base events are very low-level in nature. As a result, an understanding of the interactions which occurred within the virtual world can be acquired.

It is emphasized that this understanding can be applied to collaborative meetings occurring within a virtual world. If a meeting or conversation occurs within the virtual world, the number of participants and the names of the participants can be automatically captured. This information can then be automatically included in a report and in the minutes of the meeting. Most active participants in a meeting can be identified. Interaction during a meeting can be measured.

However, this understanding is not limited to analysis of collaborative meetings. For example, the identities of each of the avatars whom a specific user has met in the virtual world can be captured and listed. The amount of interest in different objects in a virtual world can be registered.

Figure 2:
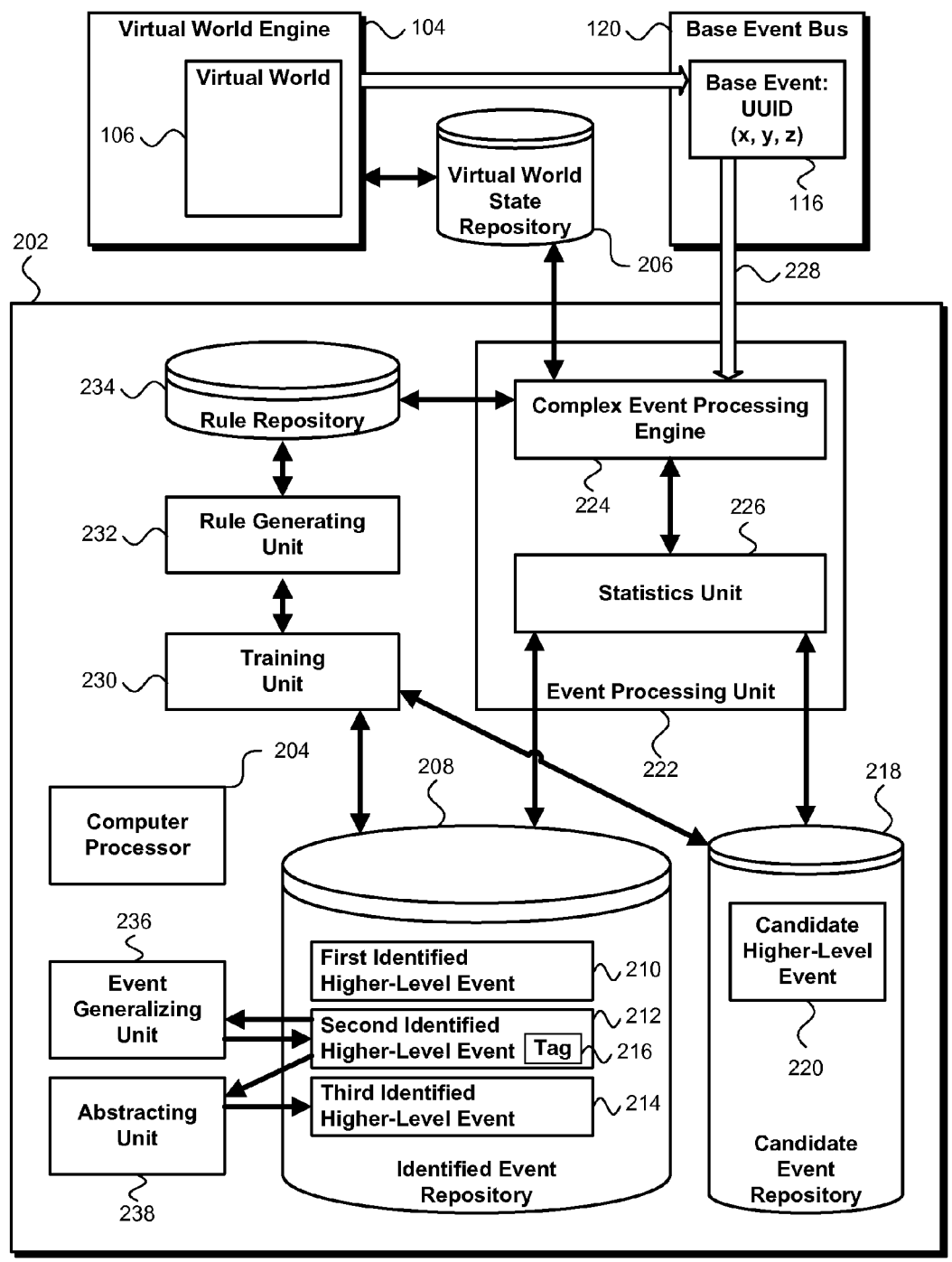
FIG. 2 illustrates an example system for identifying state changes in objects in virtual worlds.

Turning now to FIG. 2, an example system 202 for identifying state changes in objects in virtual worlds is illustrated.

The system 202 shown in FIG. 2 may exist within an environment such as the example environment shown in FIG. 1.

Any or all of the units shown in FIG. 2, including the CEP engine 224, may be implemented entirely in hardware, entirely in software (including firmware, resident software, micro-code, etc.) or in a combination of software and hardware aspects.

Any or all of the repositories shown in FIG. 2 may be stored at one or more computer readable storage media. Any such computer readable storage medium may be any of the computer readable storage media described above. Moreover, a plurality of the repositories shown in FIG. 2 may be stored at a common computer readable storage medium.

The system 202 comprises at least one computer processor 204. Each computer processor is configured to execute program code. A computer processor may be a general purpose microprocessor.

Any computer processor 204 included in the system 202 may be incorporated into a general purpose computer, special purpose computer, or other programmable data processing apparatus. Thus, computer program instructions executed at a computer processor included in one of the foregoing devices may execute at that device.

Any of the units shown in FIG. 2, including the CEP engine 224, may achieve any of the operations performed thereby by providing computer program instructions to be executed by one or more computer processors 204.

The system 202 may comprise or interact with one or more virtual world engines 104. As mentioned, a virtual world engine 104 implements one or more virtual worlds 106.

It is noted that the discussion below focuses on the processing by the system 202 of a single virtual world 106 implemented at a single virtual world engine 104. However, it is emphasized that the system may be operable to interact with multiple virtual worlds and/or multiple virtual world engines, either simultaneously or successively. To achieve this goal, the system may perform the actions described below for each virtual world, either simultaneously or successively.

The virtual world engine 104 may be associated with a virtual world state repository 206. The virtual world state repository may be comprised by the virtual world engine. The virtual world state repository may also be comprised by the system 202. The virtual world state repository contains state information for any or all of the virtual worlds 106 implemented by the virtual world engine 104. The virtual world engine may be configured to read data from and write data to the virtual world state repository.

The virtual world engine 104 may generate base events 116. Notably, the base events may encode state changes within the virtual world 106. As described above, a base event 116 may encode a state change in a very low-level form. In an embodiment of the present invention, a base event encapsulates a unique identifier of an object along with updated three-dimensional Cartesian coordinates, e.g., (x, y, z) coordinates, of the object. In a further embodiment of the present invention, the unique identifier is a Universally Unique Identifier (UUID). Those skilled in the art will appreciate that a UUID is an identifier which is designed to be unique across all computing systems worldwide.

The virtual world engine 104 may also be associated with an event bus 120. The event bus may be comprised by the virtual world engine. The event bus may also be comprised by the system 202. The virtual world engine 104 may transmit the base events via the event bus 120. In an embodiment of the present invention, the base event bus 120 is a message bus. A base event 116 is transmitted as a message via this message bus.

It is noted that the virtual world engine 104 may also employ the base events 106 internally. Such internal use may be to facilitate any of a variety of functions.

The system 202 may further comprise an identified event repository 208. The identified event repository may store higher-level events 210, 212, 214 which have previously been identified and therefore are known to the system. The higher-level events stored therein may be constructs based on multiple events. Specifically, the events on which the construct is based may be base events 116. An identified higher-level event stored in the identified event repository may include one or more tags 216. A tag may specify a wide variety of data about the identified higher-level event in which it is included.

The system 202 may further comprise a candidate event repository 218. The candidate event repository may store higher-level events 220 which are candidates for identification. As with the identified event repository 208, higher-level events stored in the candidate event repository may be constructs based on multiple events. Specifically, the events on which the construct is based may be base events 116.

The system 202 further comprises an event processing unit 222. The event processing unit is configured to generate candidate higher-level events which are derived from the base events. To achieve this goal, the event processing unit may use statistics, rules or both.

The event processing unit 222 may comprise a Complex Event Processing (CEP) engine 224. The CEP engine may be configured to implement Complex Event Processing techniques. Specifically, the CEP engine may be configured to process multiple events in order to identify the meaningful events within an event cloud. The CEP engine may be further configured to detect complex patterns of multiple events. A pattern thus detected may include a large number of events. The CEP engine may be further configured to perform event correlation and abstraction. The CEP engine may be further configured to employ techniques such as event hierarchies, event-driven processes and relationships between events. Such relationships may include causality, membership and timing. Moreover, the CEP engine may be configured to read data from and write data to the virtual world state repository 206.

The CEP engine 224 is further capable of discovering information contained in the events occurring throughout all layers of an organization. The CEP engine can subsequently analyze impacts thereof from the macro level as complex events. The CEP engine can subsequently plan actions to be taken in real time in response to the complex events.

The event processing unit 222 may further comprise a statistics unit 226. The statistics unit may implement statistical functions. Specifically, the statistics unit may be configured to identify common events by the occurrence of the events on an event bus or message bus and the correlation of the events to previously identified event constructs. Moreover, the CEP engine 224 and the statistics unit may be configured to communicate with each other.

Any or all of the event processing unit 222, the CEP engine 224 and the statistics unit 226 may be configured to read data from and write data to the identified event repository 208, the candidate event repository 218, or both.

The event processing unit 222 is configured to observe base events 116. The event processing unit may be further configured to receive 228 the base events via an event bus 120. Accordingly, the event processing unit may observe the base events which are received from the virtual world engine 104 via the base event bus. In an embodiment of the present invention, observing the base events is performed by the CEP engine 224.

The event processing unit 222 is further configured to determine by the computer processor 204 that a group of one or more of the observed base events 116 is correlated to a first identified higher-level event 210. The first identified higher-level event may be stored at, and retrieved from, the identified event repository 208. The first identified higher-level event may be an event or event construct which was previously identified.

Determining that the group of one or more of the observed base events 116 is correlated to the first identified higher-level event 210 is based at least in part on statistical analysis of the observed base events. For example, consider a scenario wherein two avatars enter a certain meeting space. In 90% of cases in which an avatar enters this space, the avatar walks to a location having the Cartesian coordinates (x, y, z). This could serve as an indication that a meeting is taking place and that the avatars walking to that location are joining the meeting. Given this statistical approach, for each instance wherein an avatar enters a space and walks to the location having the Cartesian coordinates (x, y, z), a higher-level event named "Avatar joins meeting" could be generated.

Moreover, determining that the group of one or more of the observed base events 116 is correlated to the first identified higher-level event 210 by the event processing unit 222 may be based in part on a frequency of occurrence of the group of one or more observed base events.

Determining that the group of one or more of the observed base events 116 is correlated to the first identified higher-level event 210 may be performed by the event processing unit 222, the CEP engine 224, the statistics unit 226, or any suitable combination thereof. In an embodiment of the present invention, the statistics unit 226 is configured to combine previously identified (e.g., known) higher-level events with statistically frequent observed base events or constructs thereof. The CEP engine is configured to employ the statistics unit 226 (including the foregoing result), rules, or both to generate candidate higher-level events.

The event processing unit 222 is further configured to store a candidate higher-level event 220. The candidate higher-level event includes the determined group of one or more of the observed base events 116. The candidate higher-level event may be stored at the candidate event repository 218. In an embodiment of the present invention, storing the candidate higher-level event is performed by the CEP engine 224. In another embodiment of the present invention, storing the candidate higher-level event is performed by the statistics unit 226.

The system 202 further comprises a training unit 230. The training unit may be configured to replay events. Specifically, the replayed events may be candidate higher-level events. As a result, the training unit may replay the candidate higher-level event 220 stored by the event determining unit 222. Accordingly, the training unit may be configured to read data from and write data to the candidate event repository 218.

The training unit 230 is configured to receive user input about the candidate higher-level event 220. The received user input comprises a specification of whether the candidate higher-level event is to be stored as an identified higher-level event.

The training unit 230 is further configured to, if the received user input specifies that the candidate higher-level event 220 is to be stored, store the candidate higher-level event as an identified higher-level event 212. The identified higher-level event may be stored at the identified event repository 208. Accordingly, the training unit may be configured to read data from and write data to the identified event repository.

The user input received by the training unit 230 may further comprise a tag associated with the candidate higher-level event 220. In this case, storing the candidate higher-level event as the identified higher-level event 212 by the training unit comprises including the tag 216 in the identified higher-level event.

It is emphasized that the training unit 230 thus allows an end user to support or dismiss the findings of the event processing unit 222, the CEP engine 224 and the statistics unit 226 and the statistical functions embedded therein.

The system 202 may further comprise a rule generating unit 232 configured to generate rules based on a plurality of events. The events on which the generated rules are based may be higher-level events, base events or a combination thereof. Moreover, the events on which the generated rules are based may be connected with each other. The generated rules may be Complex Event Processing (CEP) rules. Moreover, the rule generating unit and the training unit 230 may be configured to communicate with each other.

Accordingly, the system may further comprise a rule repository 234. The rules generated by the rule generating unit 232 may be stored at the rule repository. Accordingly, the rule generating unit may be configured to read data from and write data to the rule repository. Similarly, the CEP engine 224 may be configured to read data from and write data to the rule repository.

The rule repository 234 may initially contain a set of starter rules. The starter rules may be provided by a trainer or another user. Over time, however, the rule generating unit 232 may detect probabilistic patterns. For example, multiple avatars joining a space at the same time may walk to a common location as in the scenario described above. This behavior may prompt the rule generating unit to generate a rule stating that a specific higher-level event is to be created whenever, within a five minute period, two or more avatars enter a space and walk to a location having the Cartesian coordinates (x, y, z). A trainer or other user may subsequently assign semantic meaning to this rule by naming it, for example, "Meeting taking place".

It is emphasized that a higher-level event on which a rule generated by the rule generating unit 232 is based may, in turn, be derived from base events. For example, a higher-level event specifying that an avatar walked to a location having the Cartesian coordinates (x, y, z) may be aggregated or derived from a plurality of base events. Each of these base events may specify that an avatar identified by a specific UUID moved a relative distance specified as a delta in each of three dimensions, e.g., ($\Delta x$, $\Delta y$, $\Delta z$). A significant quantity of such base events may be aggregated into a single higher-level event.

Determining that the group of one or more of the observed base events 116 is correlated to the first identified higher-level event 210 by the event processing unit 222 may be based in part on the rules generated by the rule generating unit 232.

The system 202 may further comprise an event generalizing unit 236. The event generalizing unit is configured to strip information from an event about the objects which interacted during that event. Specifically, the event generalizing unit is configured to remove all object identifiers included in the candidate higher-level event 220.

In an embodiment of the present invention, the event generalizing unit 236 removes object identifiers from the candidate higher-level event 220 before it is stored as the second identified higher-level event 212. Accordingly, the event generalizing unit may be configured to read data from and write data to the candidate event repository 218.

In another embodiment of the present invention, the event generalizing unit 236 operates on the second identified higher-level event 212 after the storage thereof, removing object identifiers included therein which were also present in the candidate higher-level event 220. Accordingly, the event generalizing unit may be configured to read data from and write data to the identified event repository 208.

The system 202 may further comprise an abstracting unit 238. The abstracting unit is configured to abstract an event to apply to similar objects with other identities. For example, a 3D space may include several doors. Each door has a unique identity and lifecycle. Additionally, each door may have a different configuration in terms of features such as color. Thus, the abstraction unit may define the abstract class, "door", to include all instances of doors regardless of any differences in the identity or configuration thereof. All events related to the class, "door", will be processed in a similar way. For example, each time an avatar enters through any object included in the class, "door", a generated rule may create a high-level event, "Avatar entered through door".

In an embodiment of the present invention, the abstracting unit 238 is comprised by the event generalization unit 236. In another embodiment of the present invention, the abstracting unit is separate from the event generalization unit.

Figure 3:
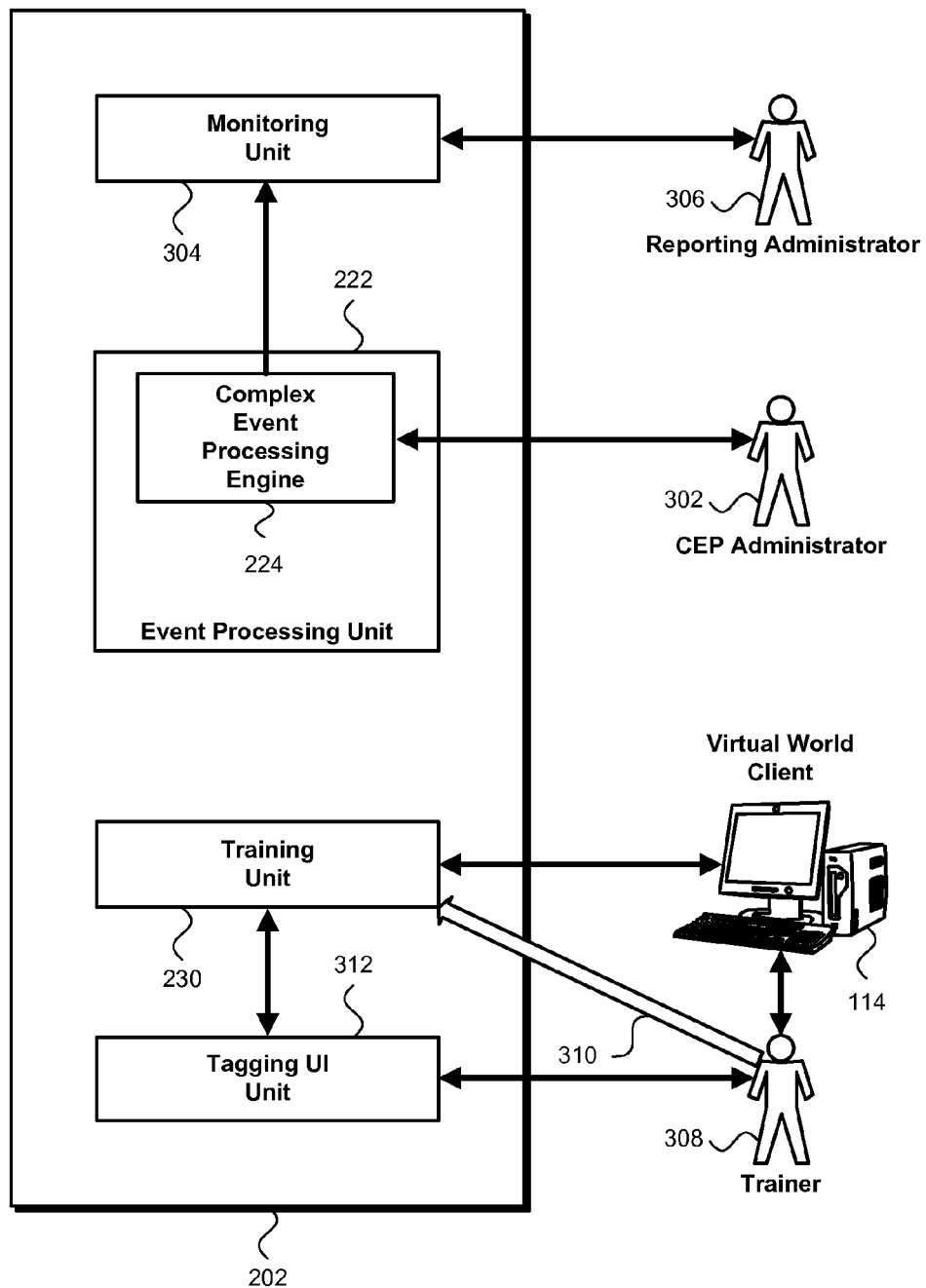
FIG. 3 illustrates example administrative functionality included in a system for identifying state changes in objects in virtual worlds.

Turning now to FIG. 3, example administrative functionality included in a system 202 for identifying state changes in objects in virtual worlds is illustrated.

The administrative functionality shown in FIG. 3 may be included in a system 202 such as the example system shown in FIG. 2. It is emphasized that a common system may thus include both the structures shown in FIG. 2 and the structures shown in FIG. 3. However, in some cases, an identical structure appears in both FIGS. 2 and 3. In such cases, the common system may include the structure only once.

In general, FIG. 2 focuses on runtime usage of the system 202, while FIG. 3 focuses on administration of the system. FIGS. 2 and 3 are displayed separately solely to simplify the discussion by focusing on each case separately.

As with FIG. 2, any or all of the units shown in FIG. 3 may be implemented entirely in hardware, entirely in software (including firmware, resident software, micro-code, etc.) or in a combination of software and hardware aspects. Moreover, any of the units shown in FIG. 3 may achieve any of the operations performed thereby by providing computer program instructions to be executed by one or more computer processors such as the computer processor shown in FIG. 2.

The system 202 comprises an event processing unit 222. The event processing unit may comprise a Complex Event Processing (CEP) engine 224.

At least one CEP administrator 302 may administer the CEP engine 224. The CEP administrator may be a user such as the administrator shown in FIG. 1. It is emphasized that although FIG. 3 shows only one CEP administrator, a plurality of users may administer the CEP engine.

The CEP administrator 302 may edit rules employed by the CEP engine 224, the event processing unit 222, or both. The CEP administrator may perform any of a variety of other functions for administration of the CEP engine.

The event processing unit 222, the CEP engine 224, or both may be configured to transmit data to and receive data from the CEP administrator 302. This transmission and receiving of data may be achieved via a network such as the network shown in FIG. 1.

The system 202 may further include a monitoring unit 304. The monitoring unit is configured to monitor the system, the virtual world, or both. In particular, the monitoring unit may monitor statistics and events. The events monitored may include base events, candidate higher-level events and identified higher-level events.

In order to facilitate this monitoring, the CEP engine 224, the event processing unit 222, or both may be configured to transmit data to the monitoring unit 304. The monitoring unit may be configured to receive this data.

The monitoring unit 304 may further be configured to generate reports. The reports generated may report the statistics and events monitored by the monitoring unit.

At least one reporting administrator 306 may request reports from the monitoring unit 304. The reporting administrator may be a user such as the administrator shown in FIG. 1. It is emphasized that although FIG. 3 shows only one reporting administrator, a plurality of users may request reports from the monitoring unit.

The monitoring unit 304 may be configured to transmit data to and receive data from the reporting administrator 306. This transmission and receiving of data may be achieved via a network such as the network shown in FIG. 1.

The system 202 further comprises a training unit 230. At least one trainer 308 may train the system 202. The trainer may be a user such as the administrator shown in FIG. 1. It is emphasized that although FIG. 3 shows only one trainer, a plurality of users may train the system.

The trainer 308 may interact with the training unit 230 in order to train the system 202. Specifically, the training unit may replay a candidate higher-level event to the trainer as discussed above. The trainer may then enter user input 310 about the candidate higher-level event. The user input comprises a specification of whether the candidate higher-level event is to be stored. The user input may also comprise a tag associated with the candidate higher-level event 220. The training unit receives this user input from the trainer and processes the user input as described above.

The trainer 308 may interact with the training unit 230 via a tagging UI unit 312. The tagging UI unit provides a user interface for tagging higher-level events. The higher-level events may include candidate higher-level events, identified higher-level events, or both. The tagging UI unit may be configured to transmit data to and receive data from the training unit, the trainer, or both. The tagging UI unit may be included in the system 202 or may be separate from the system.

The trainer 308 may also interact with the training unit 230 via a virtual world client 114. The virtual world client may be the virtual world client shown in FIG. 1.

The interactions between the training unit 230 and the trainer 308 described above may be performed via the tagging UI unit 312, the virtual world client 114, or a suitable combination thereof. Accordingly, the training unit may be configured to transmit data to and receive data from the tagging UI unit, the virtual world client, or both. This transmission and receiving of data may be achieved via a network such as the network shown in FIG. 1.

Figure 4:
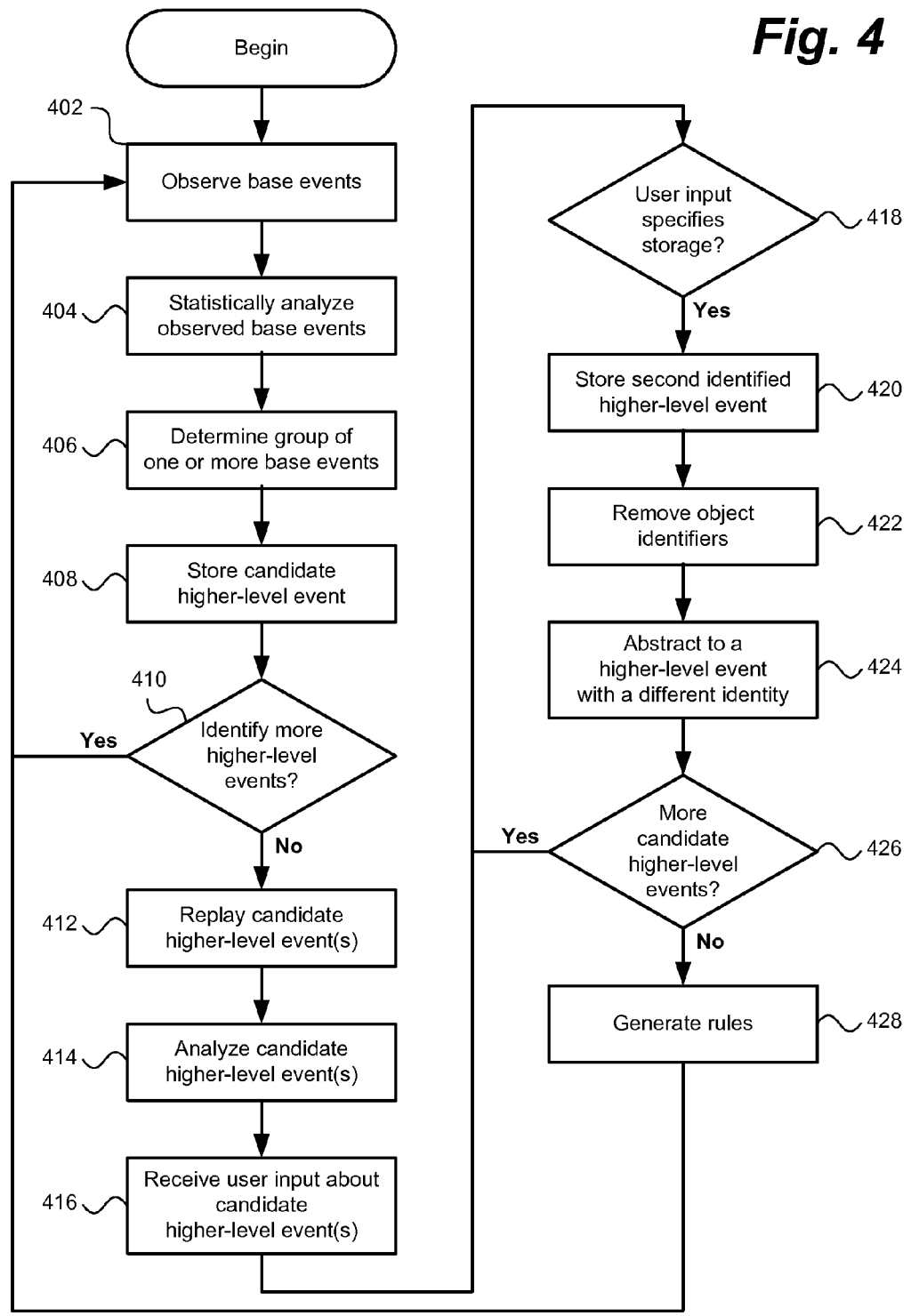
FIG. 4 demonstrates an example sequence of operations for training a system to identify state changes in objects in virtual worlds.

Turning now to FIG. 4, an example sequence of operations for training a system to identify state changes in objects in virtual worlds is demonstrated.

The example sequence of operations shown in FIG. 4 demonstrates how the system identifies higher-level events indicating the abstract situation wherein an avatar enters a room. At the beginning of the sequence of operations, a set of starter rules has already been specified as described above.

At observing operation 402, base events are observed. The base events may be the base events shown in FIGS. 1 and 2. Observing the base events may comprise receiving the base events via an event bus. The event bus may be the base event bus shown in FIGS. 1 and 2. Observing operation 402 may be performed by the event processing unit shown in FIG. 2, the CEP engine shown in FIG. 2, or both. After observing operation 402 is completed, control passes to statistical calculation operation 404.

At statistical calculation operation 404, the base events observed at observing operation 402 are statistically analyzed. This statistical analysis may comprise probabilistic analysis. This statistical analysis may further comprise combining previously identified higher-level events with statistically frequent observed base events. The previously identified higher-level events may be stored at the identified event repository shown in FIG. 2. Statistical calculation operation 404 may select a group of one or more of the observed base events and a first identified higher-level event based on the correlation of the group with the first identified higher-level event. The group may also be selected based on a high, or relatively high, frequency of occurrence within the observed base events. Statistical calculation operation 404 may be performed by the event processing unit shown in FIG. 2, the statistics unit shown in FIG. 2, or both.

For example, statistical and probabilistic analysis of a series of ($\Delta x$, $\Delta y$, $\Delta z$) movements by an avatar may determine that this series represents an avatar moving through a door. Statistical calculation operation 404 may thus identify multiple occurrences of this series.

After statistical calculation operation 404 is completed, control passes to statistical determining operation 406.

At determining operation 406, a group of one or more of the observed base events is determined. Determining operation 406 may be performed by the event processing unit shown in FIG. 2, the CEP engine shown in FIG. 2, or both. Determining operation 406 is performed by a computer processor.

Determining operation 406 may be based at least in part on the statistical analysis of the observed base events performed at statistical calculation operation 404. Accordingly, determining operation 406 may determine that the group of one or more of the observed base events selected at statistical calculation operation 404 is correlated to a candidate higher-level event selected at statistical calculation operation 404.

As noted above, statistical calculation operation 404 may select the group based in part on its frequency of occurrence. Therefore, determining that the group of one or more of the observed base events is correlated to the a candidate higher-level event may also be based in part on a frequency of occurrence of the group of one or more observed base events.

Determining operation 406 may also employ rules, such as the rules stored in the rule repository shown in FIG. 2, to determine the group of one or more of the observed base events. Therefore, determining that the group of one or more of the observed base events is correlated to the a candidate higher-level event may be based in part on the generated rules.

For example, determining operation 406 may gather multiple similar series of (Δx, Δy, Δz) movements which were identified at statistical calculation operation 404 into groups.

Statistical calculation operation 404 and determining operation 406 may alternately be performed multiple times in order to determine the group. The operations may also be tightly integrated. The operations may even be performed in a reverse order. For example, determining operation 406 may be invoked first and may then invoke statistical calculation operation 404 to perform statistical analysis.

In the example sequence of operations shown in FIG. 4, a doorway is identifiable by a first object constituting the top of the doorway, a second object constituting the right side of the doorway and a third object constituting the left side of the doorway. A first identified higher-level event indicates that an avatar moved between three objects of the types described above. Thus, base events indicating that an avatar moved between three objects of said types (and which therefore correlate with the first identified higher-level event) are identified at determining operation 406 and included in the group.

Thus, it is emphasized that statistical calculation operation 404 and determining operation 406 detect patterns. The patterns are series of related events. The events may be base events, higher-level events or a combination thereof.

After determining operation 406 is completed, control passes to storing operation 408.

At storing operation 408, the candidate higher-level event is stored. The candidate higher-level event includes the group of one or more of the observed base events determined at determining operation 406. The candidate higher-level event may be stored at the candidate event repository shown in FIG. 2. Storing operation 408 may be performed by the event processing unit shown in FIG. 2, the CEP engine shown in FIG. 2, the statistics unit shown in FIG. 2, or any suitable combination thereof.

The candidate higher-level event may be tentatively identified as representing a specific abstract situation. This abstract situation may be an abstract situation associated with the group of base events. Furthermore, an abstract situation may be identified by a tag. Thus, the abstract situation associated with the group of base events may be inferred from a tag included therein. In the example sequence of operations shown in FIG. 4, the candidate higher-level event is tentatively identified as representing an abstract situation identified by the tag, "avatar room enter".

After storing operation 408 is completed, control passes to determining operation 410.

At determining operation 410, it is determined whether more candidate higher-level events should be identified. If it is determined that more candidate higher-level events should be identified, control passes to observing operation 402. Otherwise, control passes to replaying operation 412.

Any number of criteria may be considered in making the foregoing determination. For example, the foregoing operations may be repeated for a specific number of iterations or for a specific time period. The foregoing operations may instead continue until a specific number of candidate higher-level events have been identified. Similarly, the foregoing operations may instead continue until a specific number of candidate higher-level events representing a shared abstract situation have been identified. The foregoing operations may instead continue until a training session is manually invoked. Moreover, any suitable combination of the preceding criteria may be considered.

In the example sequence of operations shown in FIG. 4, the foregoing operations are repeated until five candidate higher-level events are recorded which are tentatively identified as representing the abstract situation identified by the tag, "avatar room enter".

At replaying operation 412, at least one candidate higher-level event stored at storing operation 408 is replayed to a trainer. If the candidate higher-level event is tentatively identified as representing an abstract situation, the abstract situation may be suggested to the trainer. The trainer may then be prompted for user input about the candidate higher-level event. The trainer may be the trainer shown in FIG. 3. Replaying operation 412 may be performed by the training unit shown in FIGS. 2 and 3.

In an embodiment of the present invention, replaying operation 412 is repeated for each of a plurality of candidate higher-level events. In particular, a set of similar candidate higher-level events may be replayed. Similar higher-level events may be those which are tentatively identified as representing a shared abstract situation.

After replaying operation 412 is completed, control passes to training operation 414.

At training operation 414, the trainer analyzes the candidate higher-level events replayed at replaying operation 412. The trainer may be the trainer shown in FIG. 3.

The trainer then transmits user input regarding the replayed higher-level events. The user input comprises a specification of whether one or more candidate higher-level events are to be stored as an identified higher-level event. The user input may further comprise one or more tags associated with one or more candidate higher-level events. Any or all of this user input may be specified using a user interface provided via the tagging UI unit shown in FIG. 3. Ultimately, the user input may be directly or indirectly transmitted to the training unit shown in FIGS. 2 and 3.

The trainer may decide that there is a common abstract situation to all, a subset, or none of the higher-level events replayed at replaying operation 412. This abstract situation may be the tentatively identified abstract situation as described above.

In an embodiment of the present invention, the trainer may thus select the recorded candidate higher-level events which in fact represent common cases of the abstract situation. Selecting a candidate higher-level event as described above specifies that the candidate higher-level event is to be stored. Conversely, failing to select a candidate higher-level event specifies that the candidate higher-level event is not to be stored. The trainer may also tag the candidate higher-level event. Any selections and tags are transmitted as user input as described above.

In the example sequence of operations shown in FIG. 4, the trainer selects the recordings of the replayed candidate higher-level events which represent the abstract situation or event wherein two avatars meet in a room. Four of the five replayed candidate higher-level events are selected. The trainer further specifies a tag for the selected higher-level events.

After training operation 414 is completed, control passes to receiving operation 416.

At receiving operation 416, user input about a candidate higher-level event replayed at replaying operation 412 is received from the trainer. The received user input comprises a confirmation that the group of base events is correlated to the candidate higher-level. The received user input may further comprise a tag associated with the candidate higher-level event. Any or all of this user input may be received via the tagging UI unit shown in FIG. 3. Receiving operation 414 may be performed by, and the user input may be received at, the training unit shown in FIGS. 2 and 3.

In an embodiment of the present invention, whether the candidate higher-level event is correlated to the group of base events is specified by selecting, or failing to select, the candidate higher-level event as described above. In a further embodiment of the present invention, any tag applied to the abstract situation as described above is applied to all selected candidate higher-level events.

If a plurality of candidate higher-level events was replayed at replaying operation 412, receiving operation 416 may receive user input for all of the higher-level events as a group. Receiving operation 416 may instead receive user input for each higher-level event separately. In either case, the data described above may be received for each of the replayed higher-level events.

After receiving operation 416 is completed, control passes to determining operation 418.

In the example sequence of operations shown in FIG. 4, if a plurality of candidate higher-level events was replayed at replaying operation 412, the operations beginning with determining operation 418 are performed separately for each replayed candidate higher-level event. Thus, each iteration processes a separate candidate higher-level event.

At determining operation 418, it is determined whether the received user input specifies that the group of base events is correlated to the candidate higher-level event. Determining operation 418 may be performed by the training unit shown in FIGS. 2 and 3.

If the received user input specifies that the group of base events is correlated to the candidate higher-level event, control passes to storing operation 420. Otherwise, control passes to determining operation 426.

At storing operation 420, the candidate higher-level event is stored as the identified higher-level event. If the user input received at receiving operation 416 comprises a tag associated with the candidate higher-level event, then storing the candidate higher-level event as the identified higher-level event comprises including the tag in the identified higher-level event. The identified higher-level event may be stored at the identified event repository shown in FIG. 2. Storing operation 420 may be performed by the training unit shown in FIGS. 2 and 3.

In the example sequence of operations shown in FIG. 4, each of the four candidate higher-level events selected by the trainer is stored as an identified higher-level event. Each of the four stored identified higher-level events includes the tag specified by the trainer.

After storing operation 420 is completed, control passes to removing operation 422.

At removing operation 422, all object identifiers included in the candidate higher-level event are removed. Removing operation 422 may be performed by the event generalizing unit shown in FIG. 2.

In an embodiment of the present invention, as shown in FIG. 4, the object identifiers included in the candidate higher-level event are removed from the identified higher-level event.

In another embodiment of the present invention, the object identifiers are removed from the candidate higher-level event before it is stored as the identified higher-level event. In this case, removing operation 422 is performed prior to storing operation 420.

In either case, the higher-level event on which removing operation 422 operates is stripped of the identifications of any objects which interacted in the higher-level event. As a result, the identified higher-level event is subsequently devoid of object identifiers in either case. Thus, the identified higher-level event is advantageously generalized so as to be applicable to other objects engaging in similar behavior patterns. It is emphasized that this generalized event may be a base event in a future iteration of the sequence of operations shown in FIG. 4.

In an embodiment of the present invention, the object identifiers are Universally Unique Identifiers (UUID's). Thus, removing operation 422 removes all UUID's included in the candidate higher-level event, provided that the UUID's identify objects.

After removing operation 422 is completed, control passes to abstracting operation 424.

At abstracting operation 424, the higher-level event is abstracted so as to be generated for any avatar, as opposed to only an avatar having the identity specified in the base events. Abstracting operation 424 may be performed by the abstracting unit shown in FIG. 2.

Abstracting operation 424 may concatenate abstract situations. For example, suppose the system had previously learned which events constitute the abstract situation of a meeting between two avatars. In the example sequence of operations shown in FIG. 4, the system has now learned to identify which events constitute the abstract situation wherein an avatar enters a room. (The system may also understand by extension when an avatar exits a room.) Higher-level events may thus be generated in response to these abstract situations. In this case, abstracting operation 424 can concatenate higher-level events representing both abstract situations to build a new abstract situation wherein two avatars meet in a room. The concatenation may be achieved by generating a rule which fires when two higher-level events representing an avatar enter a room appear within a specific time frame. The time frame may be, for example, two minutes. Thus, the system can now advantageously determine when two avatars meet in a room.

At determining operation 426, it is determined whether all of the candidate higher-level events replayed at replaying operation 412 have been identified. If all of the candidate higher-level events have been identified, control passes to rule generating operation 428. Otherwise, control passes to determining operation 418, which processes the next candidate higher-level event.

At rule generating operation 428, rules are generated based on a plurality of higher-level events. The events on which the rules are based may be higher-level events, base events or a combination thereof. Moreover, the events on which the generated rules are based may be connected with each other. The generated rules may be Complex Event Processing (CEP) rules.

It is emphasized that the rules thus created may be applied to determine future candidate higher-level events. Moreover, the rule generated at rule generating operation 428 may be based on the identified higher-level event, another identified higher-level event or both.

After rule generating operation 428, processing may return to observing operation 402. It is emphasized that the sequence of operations shown in FIG. 4 may therefore iteratively train the system. Future iterations of the sequence of operations may identify additional higher-level events based on the higher-level events identified during previous iterations.

In summary, it is emphasized that the sequence of operations shown in FIG. 4 advantageously trains the system to identify higher-level events which represent abstract situations.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for training a system to identify state changes in objects in virtual worlds, the method comprising:

observing a group of one or more base events, wherein each base event includes a state change in an object in a virtual world;

determining by a computer processor that the group of one or more of the observed base events is correlated to a candidate higher-level event, the candidate higher-level event including at least some of the observed base events, wherein determining that the group of one or more of the observed base events is correlated to the candidate higher-level event is based at least in part on statistical analysis of the observed base events;

receiving user input confirming that the group of base events is correlated to the candidate higher-level event;

if the received user input specifies that the group of base events is correlated to the candidate higher-level, storing the candidate higher-level event as an identified higher-level event; and abstracting the identified higher-level event to another identified higher-level event, such that the another identified higher-level event includes a plurality of events similar to the identified higher level event but having a different identity than the identified higher-level event.

2. The method of claim 1, wherein observing the base events comprises receiving the base events via an event bus.

3. The method of claim 1, wherein determining that the group of one or more of the observed base events is correlated to the candidate higher-level event is based in part on a frequency of occurrence of the group of one or more observed base events.

4. The method of claim 1, further comprising generating rules based on a plurality of events.

5. The method of claim 4, wherein determining that the group of one or more of the observed base events is correlated to the candidate higher-level event is based in part on the generated rules.

6. The method of claim 1, wherein: the received user input further comprises a tag associated with the candidate higher-level event; and storing the candidate higher-level event as the identified higher-level event comprises including the tag in the identified higher-level event.

7. The method of claim 1, further comprising removing all object identifiers included in the candidate higher-level event.

8. A system for identifying state changes in objects in virtual worlds, the system comprising:

a computer processor;

an event processing unit configured to observe base events, to determine by the computer processor that a group of one or more of the observed base events is correlated to a candidate higher-level event, wherein each base event includes a state change in an object in a virtual world;

wherein determining that the group of one or more of the observed base events is correlated to the candidate higher-level event is based at least in part on statistical analysis of the observed base events;

a training unit configured to receive user input confirming that the group of base events is correlated to the candidate higher-level event, and if the received user input specifies that the group of base events is correlated to the candidate higher-level event, to store the candidate higher-level event as an identified higher-level event; and an abstracting unit configured to abstract the identified higher-level event to another identified higher-level event, such that the another identified higher-level event includes a plurality of events similar to the identified higher-level event but having a different identity than the identified higher-level event.

9. The system of claim 8, wherein the event processing unit is further configured to receive the base events via an event bus.

10. The system of claim 8, wherein determining that the group of one or more of the observed base events is correlated to the candidate higher-level event by the event processing unit is based in part on a frequency of occurrence of the group of one or more observed base events.

11. The system of claim 8, further comprising a rule generating unit configured to generate rules based on a plurality of events.

12. The system of claim 11, wherein determining that the group of one or more of the observed base events is correlated to the candidate higher-level event by the event processing unit is based in part on the rules generated by the rule generating unit.

13. The system of claim 8, wherein: the user input received by the training unit further comprises a tag associated with the candidate higher-level event; and storing the candidate higher-level event as the identified higher-level event by the training unit comprises including the tag in the identified higher-level event.

14. The system of claim 8, further comprising an event generalizing unit configured to remove all object identifiers included in the candidate higher-level event.

15. A computer program product for training a system to identify state changes in objects in virtual worlds, the computer program product comprising:

a non-transitory computer readable storage medium having computer readable program code embodied therewith, the computer readable program code configured to:

observe a group of one or more base events, wherein each base event includes a state change in an object in a virtual world;

determine by a computer processor that the group of one or more of the observed base events is correlated to a candidate higher-level event, the candidate higher-level event including at least some of the observed base events, wherein determining that the group of one or more of the observed base events is correlated to the candidate higher-level event is based at least in part on statistical analysis of the observed base events;

receive user input confirming that the group of base events is correlated to the candidate higher-level event;

if the received user input specifies that the group of base events is correlated to the candidate higher-level event, store the candidate higher-level event as the identified higher-level event; and abstract the identified higher-level event to another identified higher-level event, such that the another identified higher-level event includes a plurality of events similar to the identified higher-level event but having a different identity than the identified higher-level event.

16. The computer program product of claim 15, wherein the program code configured to observe the base events includes program code configured to receive the base events via an event bus.

17. The computer program product of claim 15, wherein the program code configured to determine that the group of one or more of the observed base events is correlated to the candidate higher-level event includes program code configured to base the determination in part on a frequency of occurrence of the group of one or more observed base events.

18. The computer program product of claim 15, further comprising program code configured to generate rules based on a plurality of events.

19. The computer program product of claim 18, wherein the program code configured to determine that the group of one or more of the observed base events is correlated to the candidate higher-level event includes program code configured to base the determination in part on the generated rules.

20. The computer program product of claim 15, wherein: the received user input further comprises a tag associated with the candidate higher-level event; and the program code configured to store the candidate higher-level event as the identified higher-level event includes program code configured to include the tag in the identified higher-level event.

21. The computer program product of claim 15, further comprising program code configured to remove all object identifiers included in the candidate higher-level event.

* * * * *